Nov. 12, 1935.  A. J. BEICH  2,020,601
METHOD AND MEANS OF CONNECTING BELTS
Filed May 24, 1934
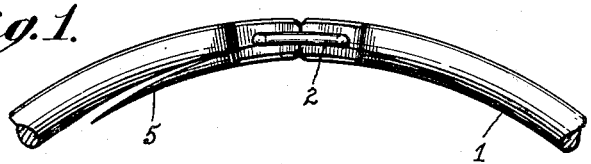
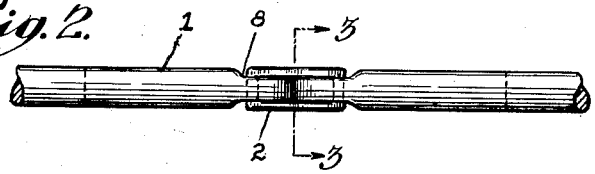
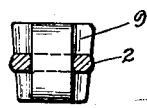
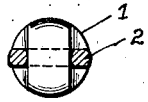
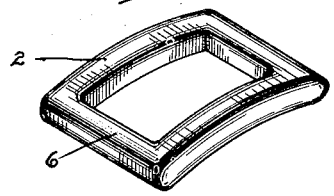
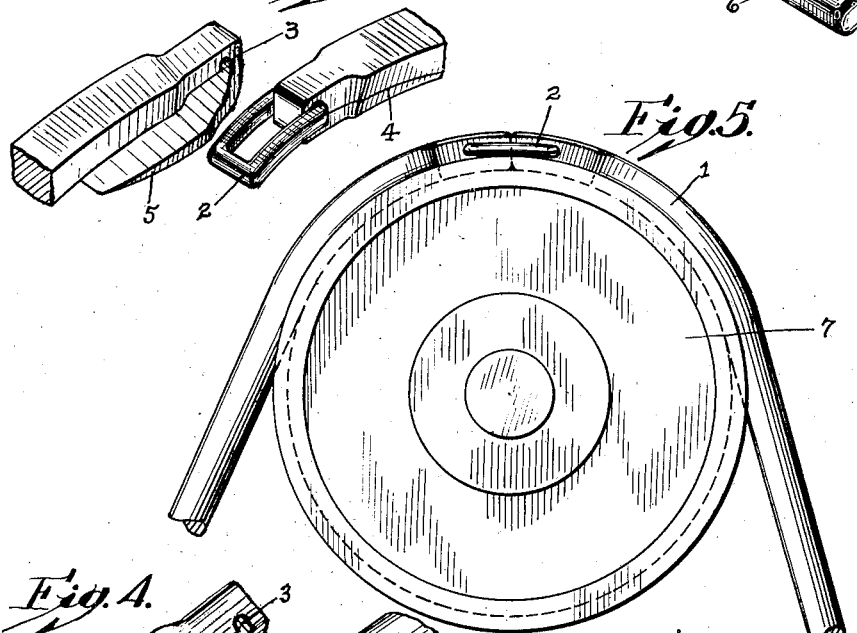
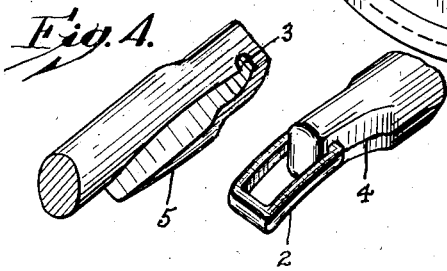
Inventor
Albert J. Beich
by Watson E. Coleman.
Attorney Patented Nov. 12, 1935

2,020,601

UNITED STATES PATENT OFFICE 2,020,601

METHOD AND MEANS OF CONNECTING BELTS

Albert J. Beich, Camden, N. J.

Application May 24, 1934, Serial No. 727,369

4 Claims. (Cl. 24—35)

This invention relates to belt fasteners and pertains particularly to an improved means of fastening together the ends of small belts.

The primary object of the present invention is to provide an improved means for connecting the ends of a belt whereby the ends will be held in relatively close relation so that a substantially continuous or endless belt is formed and whereby the overall size of the belt will not be increased so that the belt will run smoothly over a pulley.

Another object of the invention is to provide an improved means for connecting the ends of a belt whereby an integral closed connecting ring may be employed so that the possibility of the connecting element opening up and permitting the ends of the belt to separate is avoided.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in side elevation of a portion of a belt showing partially completed the connection of the ends in accordance with the present invention.

Figure 2 is a view in top plan of the portion of the belt illustrated in Figure 1.

Figure 3 is a sectional view taken on the line 3—3 of Figure 2.

Figure 4 is a view in perspective of the two separated ends of a belt of circular cross section showing the method of opening one end for receiving the connecting link.

Figure 5 is a view in side elevation of a belt having its ends connected in accordance with the present invention and passing over a sheave pulley.

Figure 6 is a view in perspective upon an enlarged scale of a connecting link.

Figure 7 is a view in transverse section of a rectangular belt connected in accordance with the present invention, the section being taken through the connection similarly to Figure 3.

Figure 8 is a view in perspective of the separated ends of a rectangular belt illustrating the method by which the ends are connected.

Referring to the drawing wherein like numerals of reference designate corresponding parts throughout the several views, the numeral 1 indicates the ends of a round belt of the type commonly employed on small machines such, for example, as sewing machines.

The present method of joining the ends of these belts is to punch a hole through each end and then force through each hole, one leg of an open staple and finally bend these legs so that the ends will come into opposed relation and will extend lengthwise of the belt. By this method, the belt frequently comes apart or the opening between the joined ends spreads so that the belt is loosened and at the same time, since this spreading is due to the opening up of the staple, the ends of the staple project beyond the side of the belt and interfere with the passage of the same over a sheave pulley.

In carrying out the present invention, there is employed an integral closed link of the character illustrated in perspective in Figure 6 and indicated generally by the numeral 2. This link is connected with the ends of the belt by forming an opening 3 transversely of each end and then slitting the belt obliquely starting upon the inner side or face and extending the slit toward the adjacent end and into the transverse hole 3. This oblique slit is indicated by the numeral 4.

After forming the slits, the tongue 5 which is thus formed, is slipped through the link or ring 2 so that the transverse end bar 6 of the link may be moved into position in the adjacent hole 3 in the manner illustrated in Figures 4 and 8. A suitable cement is then applied to the inner surface of the tongue and the latter is pressed firmly against the opposing face of the strap body and firmly cemented thereto. Figures 4 and 8 illustrate how the slit is cemented closed so as to secure the link 2 to one end of the belt.

The belts may be supplied to the trade, if desired, with the links attached to one end in the manner illustrated in Figures 4 and 8. When the belt is placed in position for use, it will be obvious that the completion of the connection between the ends is made in the same manner as the link was first joined to one end. That is, the tongue 5 at the opposing end is passed through the link and the latter slipped along the slit until the opposite end bar moves into the transverse opening or hole 3, whereupon the tongue is firmly cemented into place so that the ends will be joined closely together in the manner illustrated in Figure 5. In this figure, the belt 1 is shown passing over a grooved pulley which is indicated by the numeral 7. In Figure 1, the ends of the belt are shown connected by the link but the cementing of one tongue to the belt body has not been completed. In order that the connecting link may pass through deep pulley grooves without interfering with the proper positioning of the belt in the groove, the opposite sides of the belt may be cut out or recessed for a short distance from each end, as indicated at 8. By making these cutouts of the proper depth, the side bars of the link 2 will not project beyond the sides of the belt.

Figure 4 illustrates the separated ends of a circular belt, showing how the same are prepared for connection while Figures 7 and 8 illustrate the application of the connection to a belt of substantially rectangular cross section, which belt is indicated by the numeral 9.

From the foregoing, it will be readily apparent that by the present method of connecting belt ends, the ends may be joined closely together so that a substantially continuous or endless belt will result and the method is such that the joining link cannot open and present any ends to interfere with the smooth passage of the belt through the groove of a pulley.

What is claimed is:—

1. The herein described method of joining two ends of a belt by a previously formed integral ring, which comprises forming an opening transversely of the belt adjacent each end, then slitting the belt obliquely adjacent to each opening and extending the slit into the opening to form a tongue which is separable at one end from the main body portion of the belt, then inserting the tongue at each end of the belt into the ring and shifting the latter to bring a portion into each transverse passage, and finally cementing each tongue back against the main body portion of the belt from which it was cut.

2. The method of joining the ends of a belt by a previously formed integral elongated link which comprises forming a passage transversely through the belt adjacent each end, then forming a slit obliquely of the belt from the inner surface toward each free end and terminating the slit in the passage adjacent that end, thereby forming a tongue which is separable at one end from the main body portion of the belt, then inserting a side of the link between a tongue and the body portion of the belt and shifting the said sides into the passages, and finally cementing each of the tongues back against the body portion of the belt from which it was cut.

3. In a belt having two ends, coupling means between said ends, comprising a ring of unbroken continuity, the said ends of the belt having oblique cuts therein each extending toward the end and terminating in a passage formed transversely through the substance of the belt material in each of which passages a portion of said ring lies, and said cuts each being closed.

4. In a belt coupling, a belt having two ends, said belt ends being in unfolded opposed relation, and a ring formed as a solid piece without ends having oppositely disposed portions each passing through the solid substance of the belt material adjacent an end to maintain the ends in the said opposed relation.

ALBERT J. BEICH.